(12) United States Patent
Lucas et al.

(10) Patent No.: US 9,626,649 B2
(45) Date of Patent: Apr. 18, 2017

(54) SYSTEM FOR PROVIDING AN INTERACTIVE CAREER MANAGEMENT TOOL

(75) Inventors: Maeve Lucas, South Elgin, IL (US); Alexander Zorba, Madison, CT (US); Kieron J. Champion, Hale (GB); Nancy J. Cooper, Nokesville, VA (US); Rohini S. Rajagopal, Thiruvananthapuram (IN); Shobha Belakerappa, Bangalore (IN); Christina S. Wolf, Cornelius, NC (US)

(73) Assignee: Accenture Global Services Limited, Dublin (IE)

( * ) Notice: Subject to any disclaimer, the term of this patent is extended or adjusted under 35 U.S.C. 154(b) by 1073 days.

(21) Appl. No.: 12/551,170

(22) Filed: Aug. 31, 2009

(65) Prior Publication Data
US 2011/0055101 A1    Mar. 3, 2011

(51) Int. Cl.
*G06Q 10/00* (2012.01)
*G06Q 50/00* (2012.01)
*G06Q 10/10* (2012.01)
*G06Q 50/20* (2012.01)

(52) U.S. Cl.
CPC .......... *G06Q 10/10* (2013.01); *G06Q 10/105* (2013.01); *G06Q 50/2057* (2013.01)

(58) Field of Classification Search
CPC .................................................. G06Q 10/1053
USPC ........................................................ 705/328
See application file for complete search history.

(56) References Cited

U.S. PATENT DOCUMENTS

| | | | |
|---|---|---|---|
| 5,978,767 A * | 11/1999 | Chriest et al. ................ 705/328 |
| 6,889,359 B1 * | 5/2005 | Conner ............... G06F 17/2235 715/207 |
| 7,505,919 B2 * | 3/2009 | Richardson .................. 705/7.14 |
| 2005/0114203 A1 * | 5/2005 | Savitsky et al. ................ 705/11 |
| 2006/0074982 A1 * | 4/2006 | Spodaryk et al. ......... 707/104.1 |

(Continued)

OTHER PUBLICATIONS

EPIK Korea (Internet Wayback Machine screenshot of http://www.reachtoteachrecruiting.com/english-teaching-jobs-in-korea-with-epik.html dated May 22, 2009.*

(Continued)

*Primary Examiner* — Kathleen Palavecino
*Assistant Examiner* — Maame Ofori-Awuah
(74) *Attorney, Agent, or Firm* — Brinks Gilson & Lione

(57) ABSTRACT

A system is described for providing an interactive career management tool. The system may include a memory, an interface, and a processor. The memory may store job levels and career option descriptions associated with business function and job identifiers. Each job level may be associated with experience and expectation descriptions. The processor may receive a business function and job identifier and may retrieve the associated career option descriptions and job levels along with the experience and expectation descriptions associated with each job level. The processor may transform the job levels, experience descriptions, and expectation descriptions into a table. The processor may transform the career option descriptions into an interactive display which includes several shapes. Each career option may be displayed when the user selects a shape associated with the career option description. The processor may provide the table and the interactive display to a device of the user.

23 Claims, 14 Drawing Sheets

(56) References Cited

U.S. PATENT DOCUMENTS

| | | | |
|---|---|---|---|
| 2006/0195335 A1* | 8/2006 | Christian et al. | 705/1 |
| 2007/0192314 A1* | 8/2007 | Heggem | G06F 17/30867 |
| 2008/0104016 A1* | 5/2008 | Atmaja | 707/2 |
| 2008/0198156 A1* | 8/2008 | Jou et al. | 345/418 |

OTHER PUBLICATIONS

Examiner's First Report from Australia Patent Office in related Australia Patent Application No. 2010203133 mailed Jul. 7, 2011.
D1—Cited Document in the Examiner's First Report mailed Jul. 7, 2011.
Eick, S.G. "Visual Discovery and Analysis," IEEE Transactions on Visualization and Computer Graphics, 1, 2000, 44-58.

* cited by examiner

SYSTEM FOR PROVIDING AN INTERACTIVE CAREER MANAGEMENT TOOL

TECHNICAL FIELD

The present description relates generally to a system and method, generally referred to as a system, for providing an interactive career management tool, and more particularly, but not exclusively, to providing employees of an organization with career management information in a clear and concise manner such that the employees can utilize the information to effectively manage their careers.

BACKGROUND

In order for employees of an organization to achieve their career goals, the employees need to be provided with access to job responsibilities, standard objectives and individual career level guidance in a clear and concise manner. Individual performance expectations and career guidance may be particularly beneficial in the context of an organization which focuses on specialization of skills, such as a consulting organization. The performance expectations and career guidance should be provided to the employees in such a way that the employees can easily comprehend and benefit from the information. However, despite the benefits of providing this information to employees, this information is often not readily available to employees, and is generally not provided to the employees in such a way that the employees can easily comprehend and benefit from the information. The information may often be dispersed throughout disparate regions and/or departments of an organization, making it difficult for employees to access the information. Furthermore, the information may be inconsistent within various regions and/or departments of the organization, leaving employees with no clear understanding of their individual performance expectations and career guidance.

SUMMARY

A system for providing an interactive career management tool may include a memory, an interface, and a processor. The memory may be connected to the processor and the interface and may store career option descriptions and job levels associated with business function identifiers and job identifiers. Each job level may be associated with experience descriptions and expectation descriptions. The interface may be connected to the memory and may communicate with a device of a user. The processor may be connected to the memory and the interface. The processor may receive, from the device of the user, a job identifier and a business function identifier. The processor may retrieve, from the memory, the job levels associated with the received business function identifier and job identifier, and the experience descriptions and expectation descriptions associated with each job level. The processor may retrieve, from the memory, the career option descriptions associated with the business function identifier and the job identifier. The processor may transform the job levels, the experience descriptions, and the expectation descriptions into a table. The table may display the experience descriptions and expectation descriptions associated with each job level. The processor may transform the career option descriptions into an interactive display. The interactive display may include several shapes associated with the career option descriptions. The career option descriptions may be displayed to the user when the user selects the associated shape. The processor may provide the table and the interactive display to the device of the user.

Other systems, methods, features and advantages will be, or will become, apparent to one with skill in the art upon examination of the following figures and detailed description. It is intended that all such additional systems, methods, features and advantages be included within this description, be within the scope of the embodiments, and be protected by the following claims and be defined by the following claims. Further aspects and advantages are discussed below in conjunction with the description.

BRIEF DESCRIPTION OF THE DRAWINGS

The system and/or method may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

FIG. 10A is a screenshot of a user interface for accessing an interactive career management tool which incorporates an interactive table displaying a selected column in the system of FIG. 1, or other systems for providing an interactive career management tool.

FIG. 10B is a screenshot of a user interface for accessing an interactive career management tool which incorporates an interactive table displaying a selected row in the system of FIG. 1, or other systems for providing an interactive career management tool.

DETAILED DESCRIPTION

A system and method, generally referred to as a system, may relate to providing an interactive career management tool, and more particularly, but not exclusively, providing employees of an organization with career management information in a clear and concise manner such that the employees can utilize the information to effectively manage their careers. The principles described herein may be embodied in many different forms.

Figure 1:
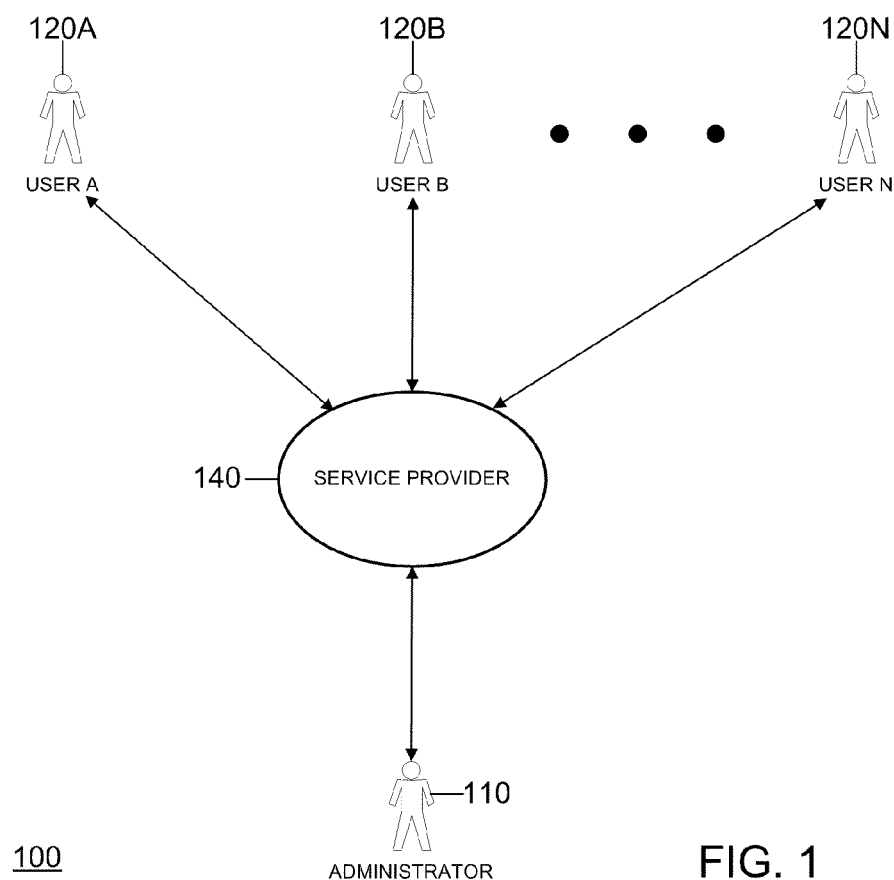
FIG. 1 is a block diagram of a general overview of a system for providing an interactive career management tool.

FIG. 1 provides a general overview of a system 100 for providing an interactive career management tool. Not all of the depicted components may be required, however, and some implementations may include additional components. Variations in the arrangement and type of the components may be made without departing from the spirit or scope of the claims as set forth herein. Additional, different or fewer components may be provided.

The system 100 may include one or more users 120A-N, a service provider 140, and an administrator 110. The users 120A-N may be employees of an organization who are skilled professionals specializing in a variety of areas, such as such as finance and accounting, information technology, help desk services, procurement, learning and training, and human resources. The users 120A-N may work on engagements that are long-term partnerships with clients of the organization to provide specialized business operations. The organization may provide services, such as consulting services, and may be located in several geographic regions across the world.

The service provider 140 may provide the users 120A-N with an interactive career management tool, such as a network accessible web application, which allows the users 120A-N to effectively manage their careers. The users 120A-N may use the interactive career management tool to search for information associated with a job by business function and/or job level. In the system 100, a job may be a particular set of responsibilities, work activities and underlying skills, and a business function may be a conceptual grouping of jobs that have similar skills, requirements and related career paths. Each job may be associated with one or more job levels which may distinguish varying levels of skill within the job.

For example, a user A 120A may search for a job and the service provider 140 may provide the user A 120A with information associated with each level of the job, such as responsibility requirements, experience requirements, accountability and risks, skill and knowledge requirements, and performance objectives. The service provider 140 may also provide the users 120A-N with descriptions of career options available to a user A 120A having the job, such as growth to a management position, growth within their discipline or business function, and changing to another discipline. The service provider 140 may further provide the users 120A-N with learning paths, job-specific web log (blog) posts, job-based learning programs, and illustrative career paths. The information provided by the service provider 140 may allow the users 120A-N to identify and achieve the experience, knowledge and skill requirements associated with each level of the job.

The service provider 140 may display the career option descriptions associated with a selected job in a format that is clear and concise, such as through an interactive graphical display. For example, an interactive graphical display may include several linked shapes, such as circles. There may be a first shape associated with the selected job and several shapes linked to the first shape. Each linked shape may be associated with a career option description associated with the selected job. For example, there may be a shape associated with a description of a growth to a management job, a shape associated with a description of a growth to another job within the discipline, or business function, and a shape associated with a description of a change to another discipline or business function. When the user A 120A selects one of the shapes, such as by moving a pointing icon over one of the shapes, the service provider 140 may display the career option description associated with the shape. For example, if the user A 120A moves the pointing icon over the shape associated with a growth to a management position, the service provider 140 may display information relating to management jobs available to the user A 120A and/or suggestions to guide the user A 120A into a management job. An interactive display for providing career options in a clear and concise manner may be discussed in more detail in FIGS. 9A-B below.

The service provider 140 may also display information associated with a selected job using a table, such as an interactive table or a comparison table. Each level of the job may be a row of the table, and the experience and responsibility requirements of each level may be the columns of the table. Alternatively, each level of the job may be a column of a table, and the experience and responsibility requirements of each level may be the columns of the table. There may be multiple types of experience requirements displayed in the interactive table, such as degree of experience and years of experience. There also may be multiple types of responsibility requirements displayed in the interactive table, such as work complexity/accountability, client accountability, people expectation management, and job specific scope. Alternatively or in addition, the tables may be static and displayed on a single page.

In the system 100, work complexity/accountability may refer to relative span of control of a user A 120A in a job, as measured by multiple factors depending upon the job, such as the size of the team, the size of the contract, the complexity of the job requirements and the risk associated with failing to perform the job requirements. Client accountability may refer to the degree to which a user A 120A has direct client/customer interaction, expectation management, and/or contract management. Client accountability may further refer to the degree of accountability the user A 120A has to the client, customer and/or organization. People expectation management may refer to the scope of work effort and/or team sizes to indicate the level of responsibilities for the job. Job specific scope criteria may refer to job specific work complexity/accountability, expectations, and/or metrics.

In the example of an interactive table, the service provider 140 may provide the interactive table to the user such that the table only displays information which is selected by the user A 120A, while preventing other extemporaneous information from being displayed, thereby allowing the user A 120A to view pertinent information in a clear and concise manner. For example, if the user A 120A selects one of the job levels, only the responsibilities and requirements associated with the selected job level are displayed, while the rest of the information in the table is prevented from being displayed. Alternatively, if the user A 120A selects one of the job experience requirements or job responsibility requirements, the table may display only the selected job experience or responsibility requirement across each of the job levels, while preventing any other information from being displayed. An interactive table for providing job information in a clear and concise manner may be discussed in more detail in FIGS. 10A-B below.

In the example of a comparison table, the service provider 140 may provide a table to the user A 120A which simultaneously displays all the experience and responsibility requirements for each job level of the selected job side-by-side, thereby allowing the user A 120A to assess and compare the requirements of each job level. Alternatively, each job level of the selected job may be a row of the table, and the experience and responsibility requirements for each level may be the columns of the table. Alternatively or in addition, an advanced user B 120B may request to compare the job experience requirements and job responsibility requirements of two or more job levels. The user B 120B may identify the job and the two or more levels which the user B 120B wishes to compare. In this instance, the service provider 130 may provide a comparison table to the user B 120B which only displays the job levels identified by the user B 120B. A table for comparing the experience and responsibility requirements for each job level may be discussed in more detail in FIG. 11 below. The service provider 140 may provide a user A 120A with information associated with a selected job through any combination of the career options interactive display, the interactive table, and/or the comparison table.

The administrator 110 may be a person or an automated process, and may be responsible for maintaining a database storing the business function identifiers, job identifiers, job levels and the associated experience requirements and responsibility requirements. The database of job levels and associated requirements may be manually compiled by the administrator 110 by aggregating disparate job information located throughout the organization. The information may be aggregated across both geographic locations of the organization and/or departments of the organization. Alternatively or in addition, the administrator 110 may use an automated process to retrieve the job levels and associated requirements from various data sources within the organization. For example, the administrator 110 may configure one or more data feeds from relevant data sources within the organization. The data feeds may provide updated data to the system 100 whenever the data sources are modified.

Alternatively or in addition, in the case of an organization that provides consulting services, the administrator 110 may be a consultant who provides consulting services to one or more clients of the organization. The administrator 110 may maintain the job information for each client utilizing the consulting services of the organization. The administrator 110 may work with various departments of each client to identify and retrieve the relevant job data required by the system 100. The administrator 110 may configure one or more data feeds to provide updated data from the clients to the system 100 whenever the client data is modified.

The business function identifiers, job identifiers, and associated job levels available in the system 100 may be implementation dependent based on the business functions and associated jobs within the organization utilizing the system 100. The job levels may vary for each business function and job. In one example, the job levels of an organization may include a senior executive job level, and job levels A-H, respectively. In this example, the business functions may include innovation and offering management, sales, sales enablement, solution architecture, mobilization, account management, service delivery management organization and contract service delivery and project management.

The business functions may each be associated with one or more jobs. The jobs associated with each business function may also be implementation dependent. In the above example, the business function of innovation and offering management may be associated with the jobs of an innovation and offering management portfolio lead, an offering and services lead, and an offering lifecycle manager. The sales business function may be associated with the jobs of an outsourcing portfolio sales support lead, a sales support lead, a sales origination lead, and a sales capture lead. The sales enablement business function may be associated with the jobs of a competitive analysis architect, a price to win architect, a campaign support manager, and a sales operations program specialist. The solution architecture business function may be associated with the jobs of a solution architect, a costing architect, and a solution specialist. The mobilization business function may be associated with the jobs of a mobilization portfolio lead, a mobilization lead, and a mobilization specialist. The account management business function may be associated with the jobs of an outsourcing account delivery portfolio lead, an outsourcing account delivery manager, a service manager, and a service management specialist. The service delivery management organization business function may be associated with the jobs of a service delivery organization lead, a delivery group lead, and a client service team manager. The contract service delivery and project management business function may be associated with the jobs of a contract service delivery manager, a project manager, and a release management specialist.

Figure 2:
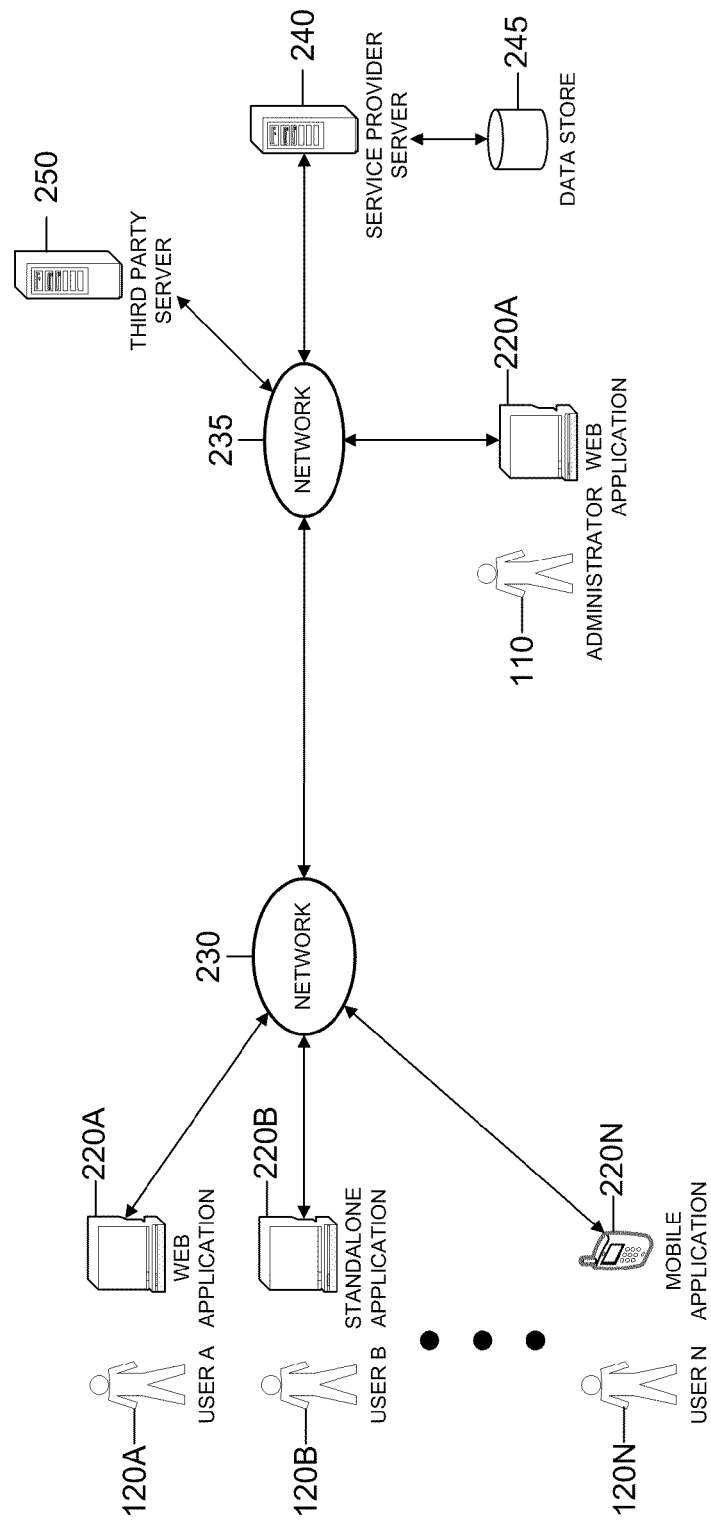
FIG. 2 is a block diagram of a network environment implementing the system of FIG. 1 or other systems for providing an interactive career management tool.

FIG. 2 provides a simplified view of a network environment 200 implementing the system of FIG. 1 or other systems for providing an interactive career management tool. Not all of the depicted components may be required, however, and some implementations may include additional components not shown in the figure. Variations in the arrangement and type of the components may be made without departing from the spirit or scope of the claims as set forth herein. Additional, different or fewer components may be provided.

The network environment 200 may include one or more users 120A-N, an administrator 110, a service provider server 240, a third party server 250, a data store 245, networks 230, 235, and one or more web applications, standalone applications, mobile applications 220A-N, which may collectively be referred to as client applications.

Some or all of the service provider server 240 and the third party server 250 may be in communication with each other by way of network 235. The administrator 110 may use a web application 220A to interface with the service provider server 240 and maintain the database of technology components and technology configurations stored in the data store 245. Alternatively or in addition, the administrator 110 may use a mobile application 220N or a standalone application 220B to interface with the service provider server 240.

The networks 230, 235 may include wide area networks (WAN), such as the Internet, local area networks (LAN), campus area networks, metropolitan area networks, or any other networks that may allow for data communication. The network 230 may include the Internet and may include all or part of network 235; network 235 may include all or part of network 230. The networks 230, 235 may be divided into sub-networks. The sub-networks may allow access to all of the other components connected to the networks 230, 235 in the system 200, or the sub-networks may restrict access between the components connected to the networks 230, 235. The network 235 may be regarded as a public or private network connection and may include, for example, a virtual private network or an encryption or other security mechanism employed over the public Internet, or the like.

The web applications, standalone applications and mobile applications 220A-N may be connected to the network 230 in any configuration that supports data transfer. This may include a data connection to the network 230 that may be wired or wireless. Any of the web applications, standalone applications and mobile applications 220A-N may individually be referred to as a client application. The web application 220A may run on any platform that supports web content, such as a web browser or a computer, a mobile phone, personal digital assistant (PDA), pager, network-enabled television, digital video recorder, such as TIVO®, automobile and/or any appliance or platform capable of data communications. The web application 220A may support a rich internet application implemented with the ADOBE FLEX® technologies. Alternatively or in addition the web application 220A may be developed using one or more of the following technologies: ADOBE FLEXBUILDER 3®, ADOBE FLEX SUBCLIPSE®, or generally any web development technologies.

The standalone application 220B may run on a machine that may have a processor, memory, a display, a user interface and a communication interface. The processor may be operatively connected to the memory, display and the interfaces and may perform tasks at the request of the standalone application 220B or the underlying operating system. The memory may be capable of storing data. The display may be operatively connected to the memory and the processor and may be capable of displaying information to the user B 120B. The user interface may be operatively connected to the memory, the processor, and the display and may be capable of interacting with a user B 120B. The communication interface may be operatively connected to the memory, and the processor, and may be capable of communicating through the networks 230, 235 with the service provider server 240. The standalone application 220B may be programmed in any programming language that supports communication protocols. These languages may include: SUN JAVA®, C++, C#, ASP, SUN JAVASCRIPT®, asynchronous SUN JAVASCRIPT®, or ADOBE FLASH ACTIONSCRIPT®, ADOBE FLEX®, amongst others.

The mobile application 220N may run on any mobile device that may have a data connection. The data connection may be a cellular connection, a wireless data connection, an internet connection, an infra-red connection, a Bluetooth connection, or any other connection capable of transmitting data. For example, the mobile application 220N may be an application running on an APPLE IPHONE®.

The service provider server 240 may include one or more of the following: an application server, a mobile application server, a data store, a database server, and a middleware server. The service provider server 240 may exist on one machine or may be running in a distributed configuration on one or more machines.

Figure 12:
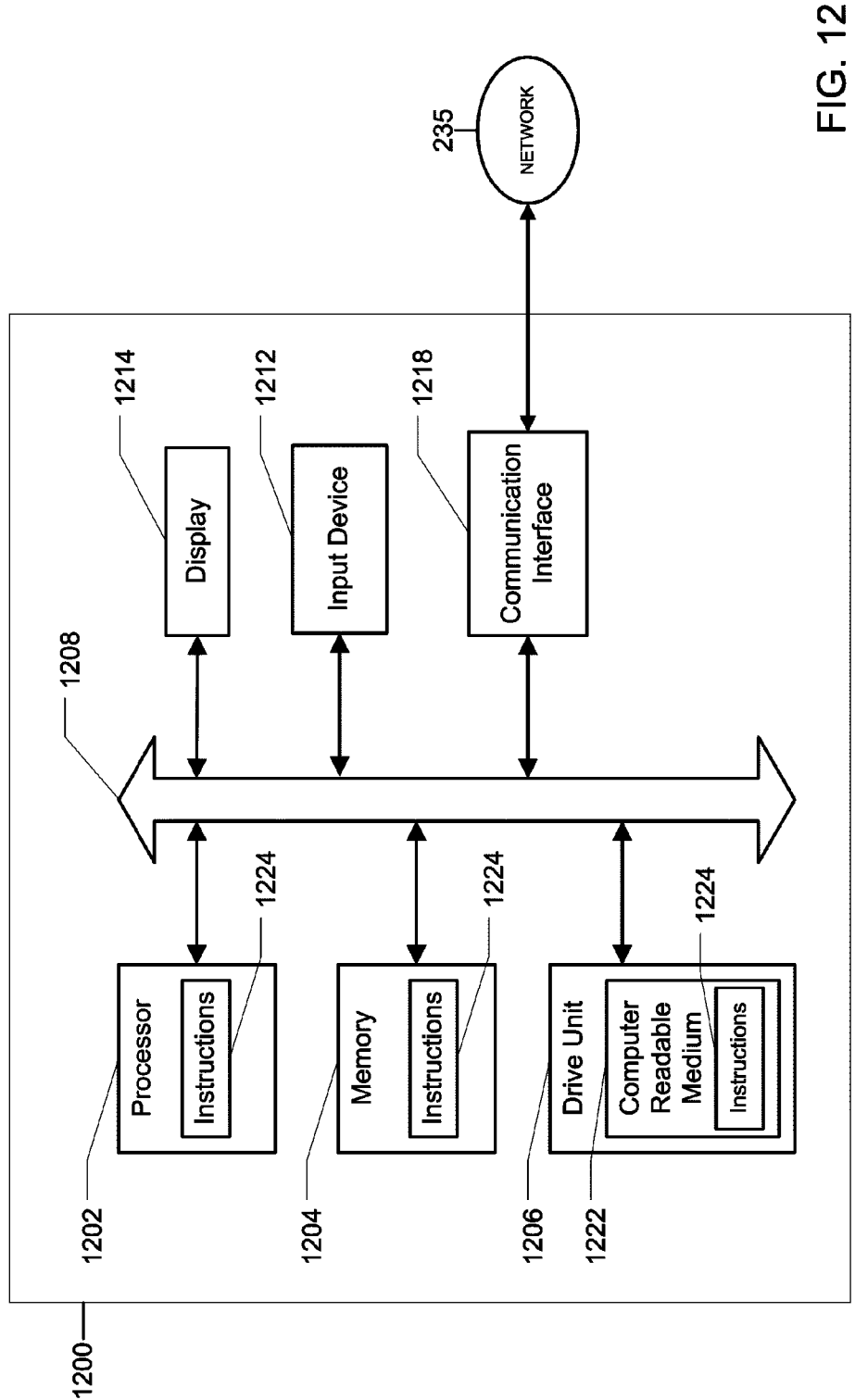
FIG. 12 is an illustration of a general computer system that may be used in the systems of FIG. 2, or other systems for providing an interactive career management tool.

The service provider server 240 and client applications 220A-N may be one or more computing devices of various kinds, such as the computing device in FIG. 12. Such computing devices may generally include any device that may be configured to perform computation and that may be capable of sending and receiving data communications by way of one or more wired and/or wireless communication interfaces. Such devices may be configured to communicate in accordance with any of a variety of network protocols, including but not limited to protocols within the Transmission Control Protocol/Internet Protocol (TCP/IP) protocol suite. For example, the web application 220A may employ the Hypertext Transfer Protocol ("HTTP") to request information, such as a web page, from a web server, which may be a process executing on the service provider server 240.

There may be several configurations of database servers, application servers, mobile application servers, and middleware applications included in the service provider server 240. The data store 245 may be part of the service provider server 240 and may be a database server, such as MICROSOFT SQL SERVER®, ORACLE®, IBM DB2®, SQLITE®, or any other database software, relational or otherwise. The application server may be APACHE TOMCAT®, MICROSOFT IIS®, ADOBE COLDFUSION®, or any other application server that supports communication protocols.

The networks 230, 235 may be configured to couple one computing device to another computing device to enable communication of data between the devices. The networks 230, 235 may generally be enabled to employ any form of machine-readable media for communicating information from one device to another. Each of networks 230, 235 may include one or more of a wireless network, a wired network, a local area network (LAN), a wide area network (WAN), a direct connection such as through a Universal Serial Bus (USB) port, and the like, and may include the set of interconnected networks that make up the Internet. The networks 230, 235 may include any communication method by which information may travel between computing devices.

In operation, the user A 120A may access the service provided by the service provider server 240 through the web application 220A and the network 230. The user A 120A may interact with the service provider server 240 through the web application 220A. The data may be passed between the web application 220A and the database 245. The majority of the calculations may be performed on the service provider server 240, although some calculations may be completed on the web application 220A in order to speed up response times.

Figure 3:
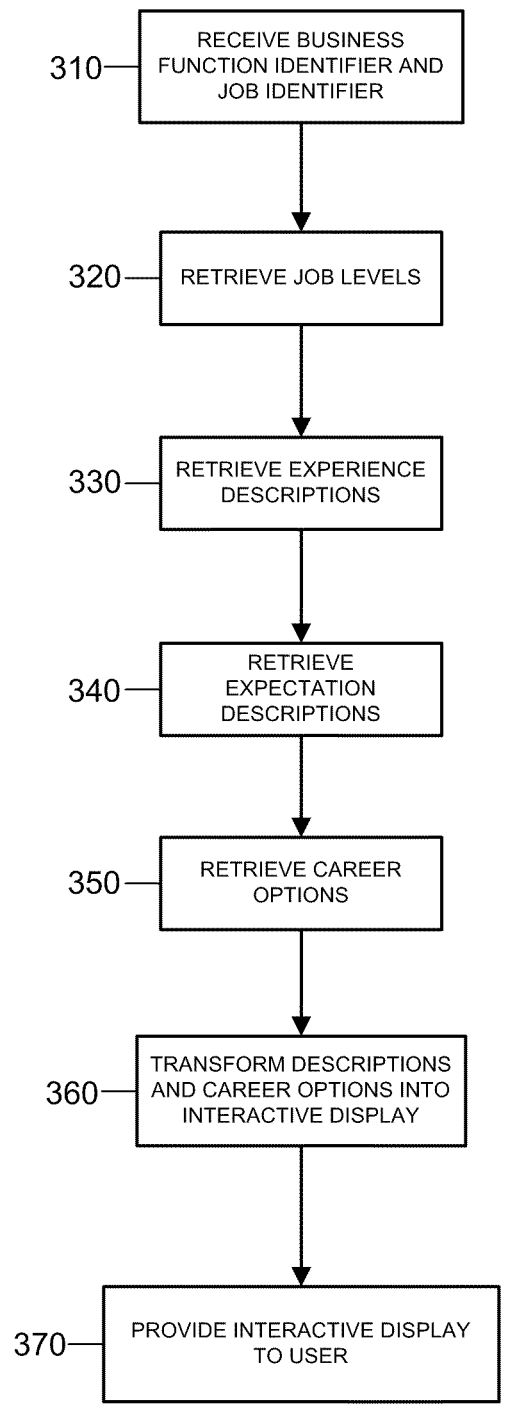
FIG. 3 is a flowchart illustrating the steps of building an interactive career management tool in the system of FIG. 1 or other systems for providing an interactive career management tool.

FIG. 3 is a flowchart illustrating the steps of building an interactive career management tool in the system of FIG. 1 or other systems for providing an interactive career management tool. The steps of FIG. 3 are described as being performed by the service provider server 240. However, the steps may be performed by the processor of the service provider server 240, or by any other hardware component of the service provider server 240. Alternatively the steps may be performed by an external hardware component.

At step 310, the service provider server 240 may receive a selection of a business function identifier and a job identifier from a user A 120A. The user A 120A may input the identifiers through a user interface provided by the service provider server 240, such as the user interface shown in FIG. 8 below. At step 320, the service provider server 240 may retrieve the job levels associated with the received business function identifier and job identifier, such as from the data store 245. At step 330, the service provider server 240 may retrieve descriptions of the experience requirements associated with each job level, such as from the data store 245. At step 340, the service provider server 240 may retrieve descriptions of the expectation requirements associated with each job level, such as from the data store 245.

At step 350, the service provider server 240 may retrieve descriptions of the career options associated with the job identifier and the business function identifier, such as a growth to management description, a growth within discipline description, and a change discipline description. The growth to management description may describe management jobs currently available to a user A 120A having the selected job. Alternatively or in addition, the growth to management description may provide suggestions to the user A 120A related to advancing to a management job. The growth within discipline description may describe jobs available within the discipline, or business function, of the selected job. Alternatively or in addition, the growth within discipline description may provide suggestions to the user A 120A related to advancing to another job within the discipline. The change discipline description may describe jobs available outside of the discipline, or business function, of the selected job. Alternatively or in addition, the change in discipline description may provide suggestions to the user A 120A related to progressing to a job within another discipline.

At step 360, the service provider server 240 may transform the job levels, experience descriptions, expectation descriptions, and career option descriptions into an interactive career management tool. For example, the service provider server 240 may transform the career option descriptions into an interactive graphical display, such as the interactive graphical display discussed in FIGS. 9A-B below. The service provider server 240 may transform the job levels, experience descriptions, and expectation descriptions into a comparison table, such as the comparison table discussed in FIG. 11 below. The comparison table may include a column header for each job level associated with the business function identifier and job function identifier selected by the user A 120A. The comparison table may also include a row header for each experience and responsibility requirement associated with each job level.

Figure 10A:
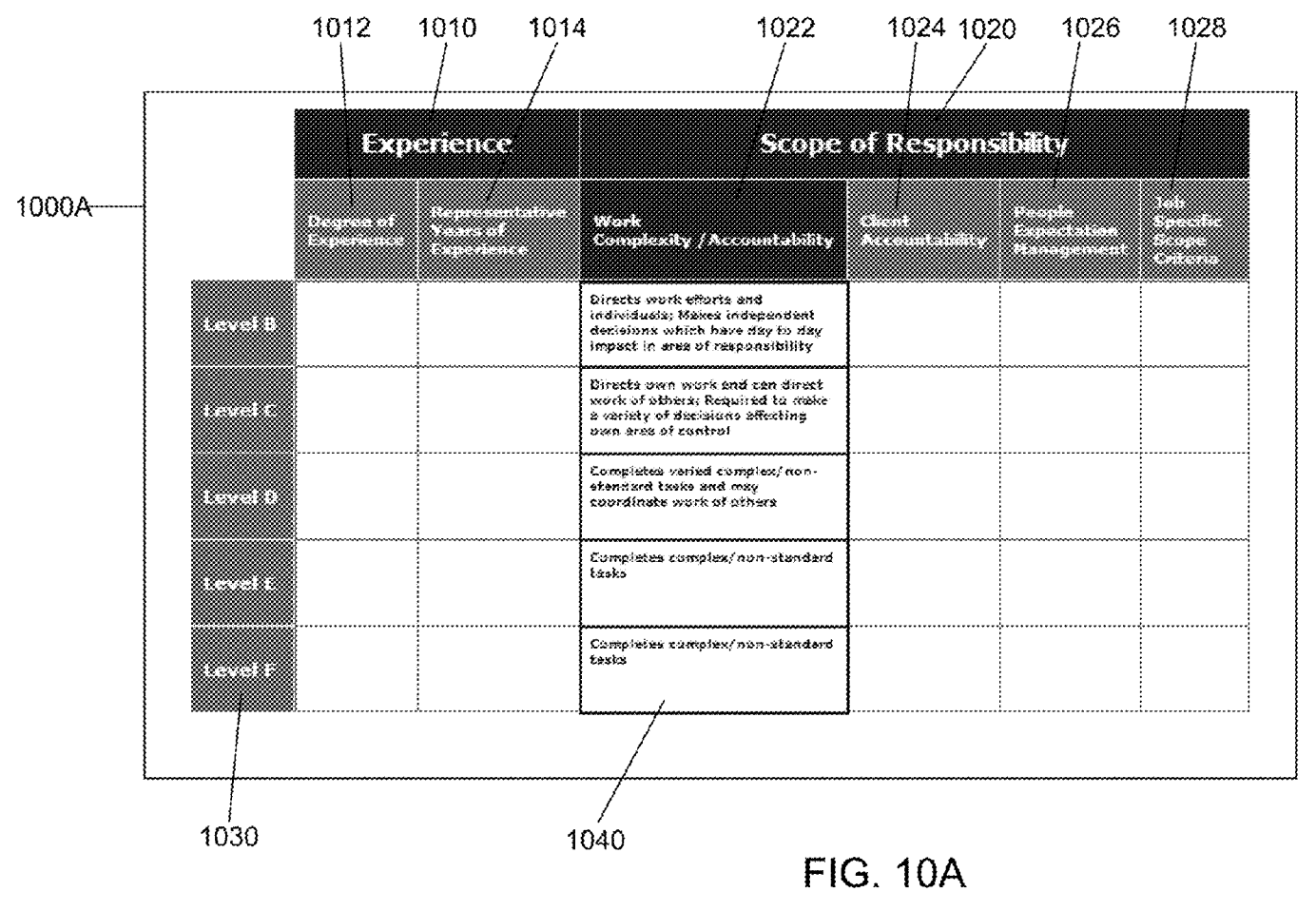
Figure 10B:
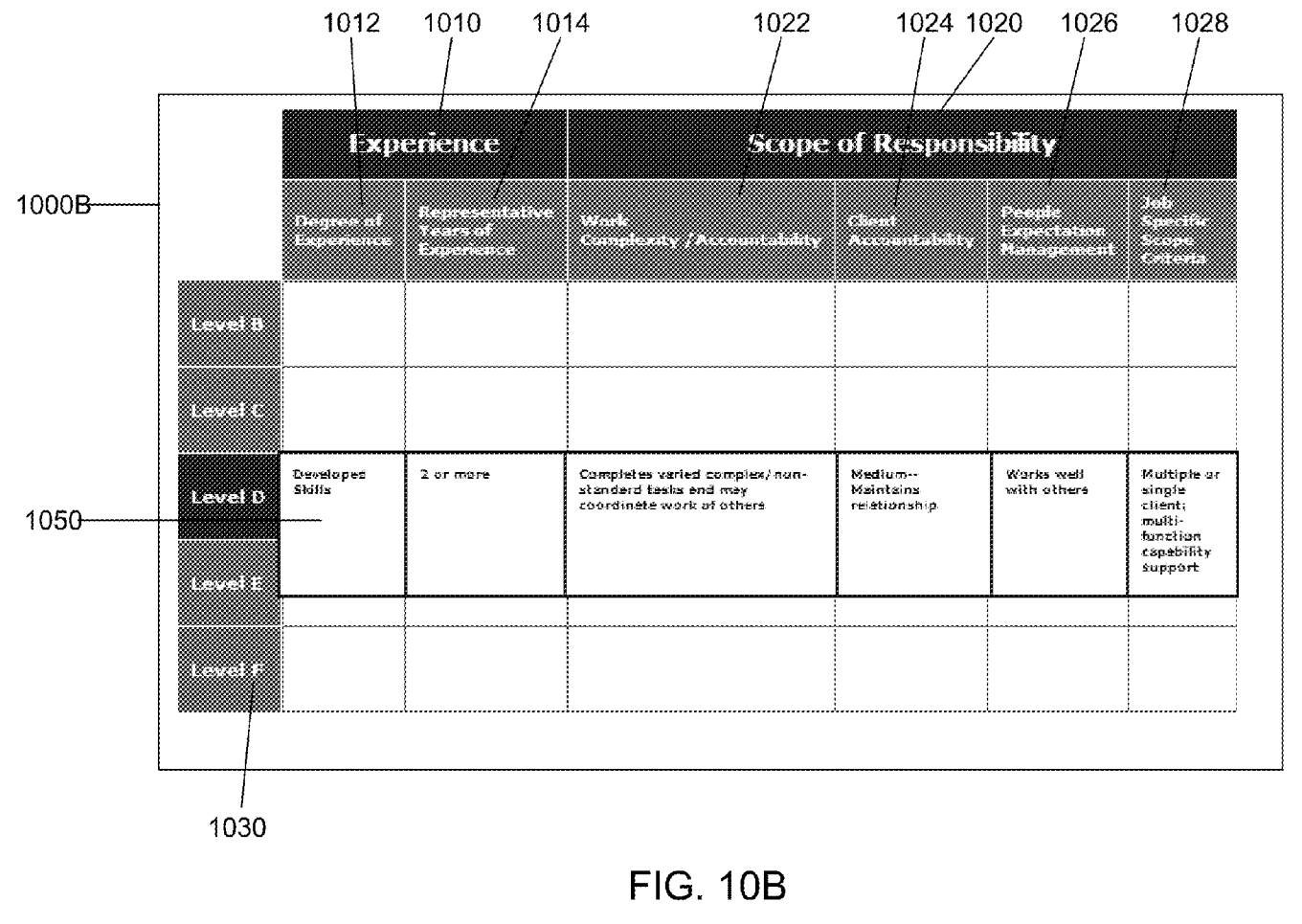

Alternatively or in addition, the service provider server 240 may transform the job levels, experience descriptions and expectation descriptions into an interactive table, such as the table displayed in FIGS. 10A-10B. The interactive table may have a column header for each experience and responsibility requirement associated with each job level. The table may have a row header for each job level associated with the business function identifier and job identifier selected by the user A 120A. A client-side interactive table is discussed in more detail in FIG. 5 below, and a client-server interactive table is discussed in more detail in FIG. 6 below.

At step 360, the service provider server 240 may provide the interactive career management tool to the user A 120A. For example, the service provider server 240 may provide the interactive display to a networked device of the user A 120A, such as through a web page. The interactive career management tool may include any combination of the career options interactive graphical display, the comparison table, the interactive table, and any additional information related to the selected business function identifier and job function identifier.

Figure 4:
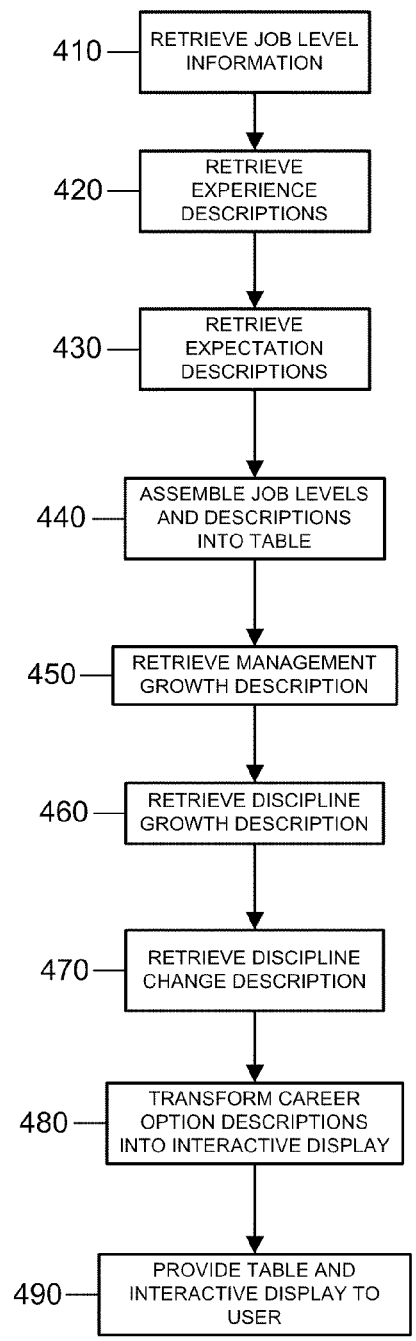
FIG. 4 is a flowchart illustrating the steps of providing an interactive career management tool which operates from the client-side in the system of FIG. 1, or other systems for providing an interactive career management tool.

FIG. 4 is a flowchart illustrating the steps of providing an interactive career management tool in the system of FIG. 1, or other systems for providing an interactive career management tool. The steps of FIG. 4 are described as being performed by the service provider server 240. However, the steps may be performed by the processor of the service provider server 240, or by any other hardware component of the service provider server 240. Alternatively the steps may be performed by an external hardware component.

At step 410, the service provider server 240 may retrieve job level information from the data store 245. For example, the service provider server 240 may retrieve each job level associated with a business function identifier and job identifier selected by a user A 120A. At step 420, the service provider server 240 may retrieve descriptions of expectation requirements associated with each job level for the selected business function identifier and job identifier. At step 430, the service provider server 240 may retrieve descriptions of the expectation requirements for each level associated with the selected business function identifier and job identifier. At step 440, the service provider server 240 may assemble the retrieved job levels and descriptions into a table, such as a comparison table or an interactive table. The table may have a column header for each experience and responsibility requirement associated with each job level, and the table may have a row for each job level associated with the selected business function identifier and job identifier. Alternatively, the table may have a row header for each experience and responsibility requirement associated with each job level, and the table may have a column header for each job level associated with the selected business function identifier and job identifier.

At step 450, the service provider server 240 may retrieve the management growth description associated with the selected business function identifier and job identifier, such as from the data store 245. At step 460, the service provider server 240 may retrieve the discipline growth description associated with the selected business function identifier and job identifier, such as from the data store 245. At step 470, the service provider server 240 may retrieve the change discipline description associated with the selected business function identifier and job identifier, such as from the data store 245.

At step 480, the service provider server 240 may transform the career option descriptions into an interactive display, such as the interactive graphical display discussed in FIGS. 9A-B below. The interactive display may display the career option descriptions when a user A 120A moves a pointing icon over a shape associated with each career option description. The service provider server 240 may transform the career option descriptions into an interactive display by integrating hypertext markup language (HTML) with the career option descriptions.

Alternatively or in addition, the service provider server 240 may transform the table into an interactive table such that the table only displays rows which are selected by the user A 120A, while preventing the display of rows not selected by the user A 120A. For example, when the user A 120A selects a row header, the table may display the row associated with the selected row header while preventing the display of the other rows in the table. The service provider server 240 may also transform the table such that the table only displays columns which are selected by the user A 120A, such as clicked on by the user A 120A, while preventing the display of columns not selected by the user A 120A. For example, when the user A 120A selects a column header, the table may display the column associated with the column header while preventing the display of the other columns in the table. The service provider server 240 may transform the table by integrating hypertext markup language (HTML) with the table information. The integrated HTML may cause the table to display a selected row while preventing the display of unselected rows.

At step 490, the service provider server 240 may provide the career options interactive display and the comparison table and/or interactive table to the user A 120A, such as through a web page. For example, the service provider server 240 may provide the career options interactive display and the table to a networked device of the user A 120A. Alternatively or in addition, the career options display and comparison table and/or interactive table may be hard coded into individual web pages associated with each business function identifier and/or job function identifier. In this example, the service provider server 240 may receive a selection of a business function identifier and job function identifier from the user A 120A, and may provide the user A 120A with the web page associated with the received business function identifier and job function identifier.

Figure 5:
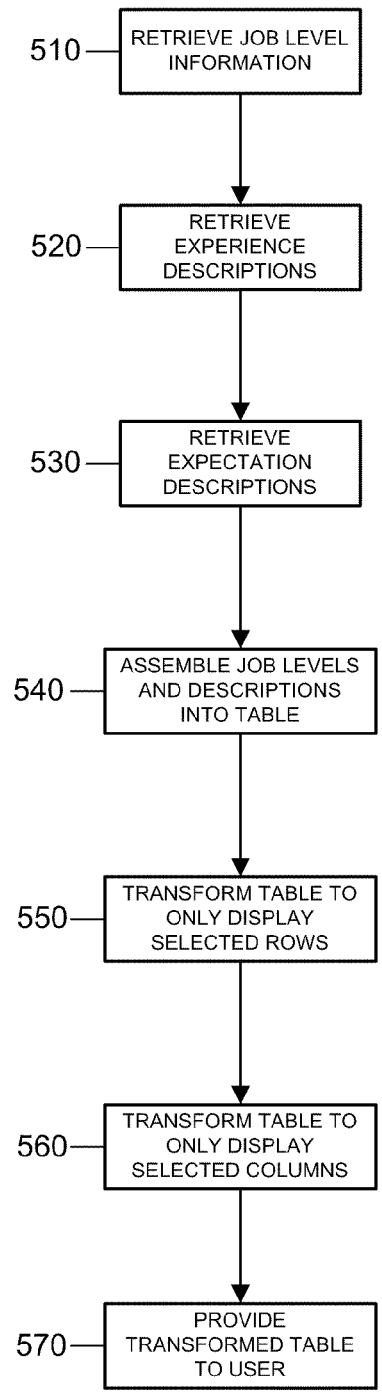
FIG. 5 is a flowchart illustrating the steps of providing an interactive career management tool incorporating an interactive table which operates from the client-side in the system of FIG. 1, or other systems for providing an interactive career management tool.

FIG. 5 is a flowchart illustrating the steps of providing an interactive table which operates from the client-side in the system of FIG. 1, or other systems for providing an interactive career management tool. A client-side interactive table may be assembled by the service provider server 240, but may operate entirely on the device of the user A 120A without further interaction with the service provider server 240. The steps of FIG. 5 are described as being performed by the service provider server 240. However, the steps may be performed by the processor of the service provider server 240, or by any other hardware component of the service provider server 240. Alternatively the steps may be performed by an external hardware component.

At step 510, the service provider server 240 may retrieve job level information from the data store 245. For example, the service provider server 240 may retrieve each job level associated with a business function identifier and job identifier selected by a user A 120A. At step 520, the service provider server 240 may retrieve descriptions of expectation requirements associated with each job level for the selected business function identifier and job identifier. At step 530, the service provider server 240 may retrieve descriptions of the expectation requirements for each level associated with the selected business function identifier and job identifier. At step 540, the service provider server 240 may assemble the retrieved job levels and descriptions into a table, such as one of the tables displayed in FIGS. 10A-B. The table may have a column header for each experience and responsibility requirement associated with each job level, and the table may have a row for each job level associated with the selected business function identifier and job identifier.

At step 550, the service provider server 240 may transform the table such that the table only displays rows which are selected by the user A 120A, while preventing the display of rows not selected by the user A 120A. For example, when the user A 120A selects a row header, the table may display the row associated with the selected row header while preventing the display of the other rows in the table. The service provider server 240 may transform the table by integrating hypertext markup language (HTML) with the table information. The integrated HTML may cause the table to display a selected row while preventing the display of unselected rows.

At step 560, the service provider server 240 may transform the table such that the table only displays columns which are selected by the user A 120A, such as clicked on by the user A 120A, while preventing the display of columns not selected by the user A 120A. For example, when the user A 120A selects a column header, the table may display the column associated with the column header while preventing the display of the other columns in the table. The service provider server 240 may transform the table by integrating hypertext markup language (HTML) with the table information. The integrated HTML may cause the table to display a selected column while preventing the display of unselected columns. At step 570, the service provider server 240 may provide the transformed table to the user A 120A, such as through a web page. For example, the service provider server 240 may provide the transformed table to a networked device of the user A 120A, such as through a web page. Alternatively or in addition, the tables may be hard coded into individual web pages associated with each business function identifier and/or job function identifier. In this example, the service provider server 240 may receive a selection of a business function identifier and job function identifier from the user A 120A, and may provide the user A 120A with the web page containing the table associated with the received business function identifier and job function identifier.

Figure 6:
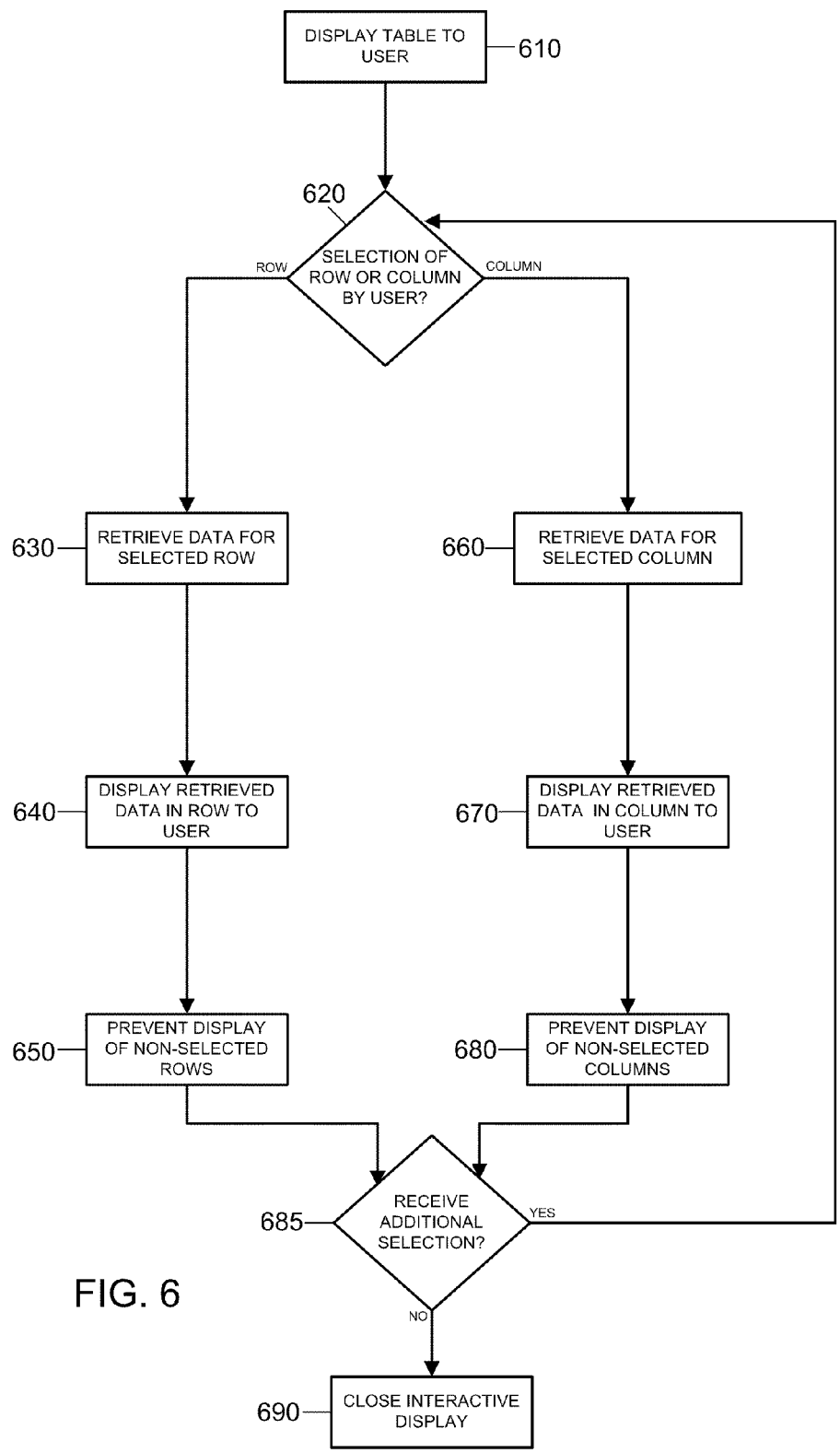
FIG. 6 is a flowchart illustrating the steps of providing a client-server interactive career management tool incorporating an interactive table in the system of FIG. 1, or other systems for providing an interactive career management tool.

FIG. 6 is a flowchart illustrating the steps of providing a client-server interactive table in the system of FIG. 1, or other systems for providing an interactive career management tool. A client-server interactive career table may be assembled by the service provider server 240 and may interact with the service provider server 240 while operating on a device of the user A 120A. The steps of FIG. 6 are described as being performed by the service provider server 240. However, the steps may be performed by the processor of the service provider server 240, or by any other hardware component of the service provider server 240. Alternatively the steps may be performed by an external hardware component.

At step 610, the service provider server 240 may display an interactive table to the user A 120A, such as by providing a web page including the interactive table to a networked device of the user A 120A. The interactive table may display job information related to a business function identifier and job identifier selected by the user A 120A. For example, the interactive table may include a column header for each experience and responsibility requirement associated with the selected business function and job identifiers and the table may include a row header for each job level associated with the selected business function and job identifiers. FIGS. 10A-B may provide exemplary interactive tables.

At step 620, the service provider server 240 may detect whether the user A 120A selected a row header or column header of the interactive table. For example, the networked device of the user A 120A may communicate a request to the service provider server 240 when the user A 120A selects a row or column header. If, at step 620, the service provider server 240 detects that the user A 120A selected a row header, the service provider server 240 moves to step 630. At step 630, the service provider server 240 determines the job level represented by the row selected by the user A 120A, and retrieves descriptions of the experience and responsibility requirements associated with the job level. At step 640, the service provider server 240 displays the retrieved descriptions in the selected row of the interactive table. At step 650, the service provider server 240 prevents the rows which are not selected from displaying information to the user A 120A. Alternatively or in addition, the service provider server 240 may hide any information currently being displayed in any non-selected rows. Steps 640 and 650 may occur simultaneously such that only information located in a selected row is displayed to the user A 120A.

At step 685, the service provider server 240 may determine whether the user A 120A selects another row header or column header of the interactive table. As mentioned above, the networked device of the user A 120A may communicate a request to the service provider server 240 when the user A 120A selects a row or column header in the interactive table. If, at step 685, the service provider server 240 determines that the user A 120A selected an additional row header or column header, the service provider server 240 returns to step 620 and repeats steps 620-685 for the newly selected row header or column header.

If, at step 685, the service provider server 240 determines that the user A 120A has not selected an additional row header or column header, the service provider server 240 moves to step 690. Alternatively or in addition, the service provider server 240 may wait for a period of time for the user A 120A to select an additional row header or column header. If the period of time elapses before the user A 120A selects another column header or row header, the service provider server 240 may move to step 690. At step 690, the service provider server 240 may close the interactive display, or may log the user A 120A out of the system 100. Alternatively or in addition, the service provider server 240 may provide the user A 120A with a notification indicating that the user A 120A has timed out and the interactive display will be closed.

If, at step 620, the service provider server 240 determines that a column header was selected by the user A 120A, the service provider server 240 moves to step 660. At step 660, the service provider server 240 determines the experience requirement or responsibility requirement represented by the column header selected by the user A 120A and retrieves the descriptions of the selected requirement for each of the job levels represented in the interactive table. At step 670, the service provider server 240 displays the retrieved descriptions in the column selected by the user A 120A. At step 680, the service provider server 240 prevents the columns which are not selected from displaying information to the user A 120A. Alternatively or in addition, the service provider server 240 may hide any information currently being displayed in any non-selected columns. Steps 670 and 680 may occur simultaneously such that only information contained in a selected column is displayed to the user A 120A.

Figure 7:
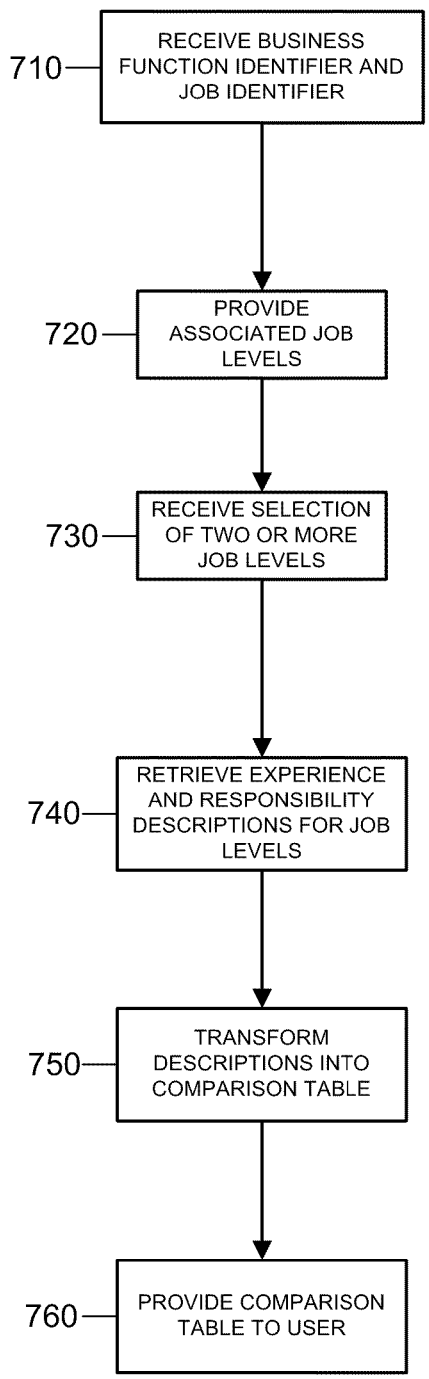
FIG. 7 is a flowchart illustrating the steps of providing a table for comparing career management information in the system of FIG. 1, or other systems for providing an interactive career management tool.

FIG. 7 is a flowchart illustrating the steps of providing a comparison table in the system of FIG. 1, or other systems for providing an interactive career management tool. The steps of FIG. 7 are described as being performed by the service provider server 240. However, the steps may be performed by the processor of the service provider server 240, or by any other hardware component of the service provider server 240. Alternatively the steps may be performed by an external hardware component.

At step 710, the service provider server 240 may receive a selection of a business function identifier and a job identifier, such as from a user A 120A. For example, a user A 120A may select a business function identifier and job identifier relating to a job of interest to the user A 120A. At step 720, the service provider server 240 may retrieve the job levels associated with the selected business function identifier and job identifier, and may provide the job levels to the user A 120A. For example, the service provider server 240 may provide the job levels to the user A 120A in a selectable list. At step 730, the service provider server 240 may receive a selection of two or more job levels from the user A 120A. For example, the user A 120A may select two or more job levels from the selectable list. Alternatively, the service provider server 240 may skip steps 720 and 730 and may automatically select all the job levels associated with the selected business function identifier and job identifier.

Figure 11:
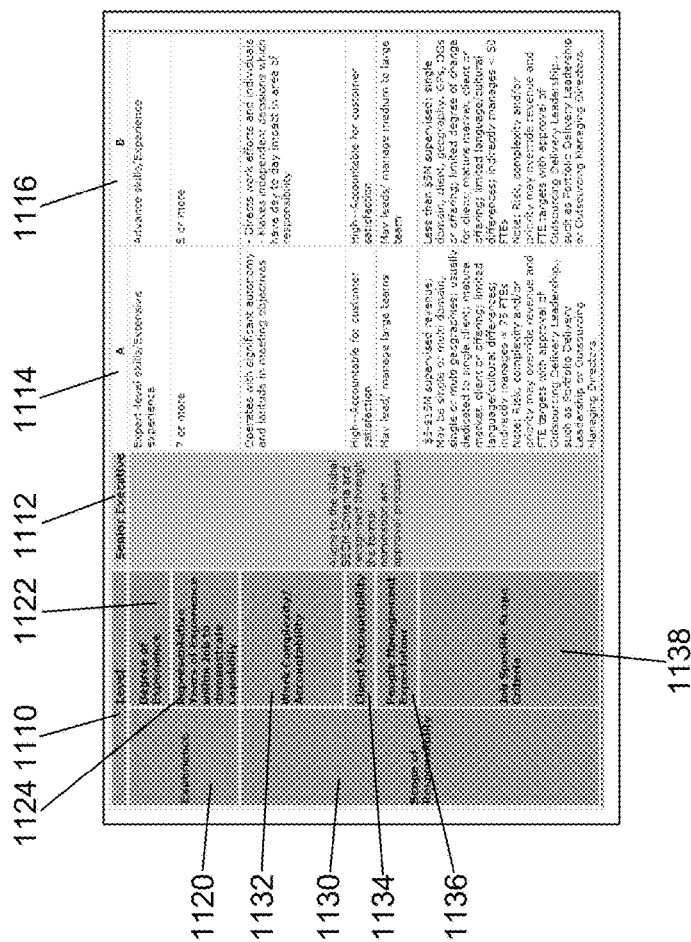
FIG. 11 is a screenshot of a user interface for viewing a career management comparison table in the system of FIG. 1, or other systems for providing an interactive career management tool.

At step 740, the service provider server 240 may retrieve descriptions of the experience requirements and responsibility requirements of the job levels selected by the user A 120A. At step 750, the service provider server 240 may transform the descriptions into a comparison table. The comparison table may provide a side-by-side display of the descriptions of the experience requirements and responsibility requirements of each job level selected by the user A 120A. FIG. 11 below describes an exemplary comparison table.

Since the comparison table is generally used to compare two or more job levels, the comparison table may not be an interactive table. That is, the comparison table may always display all of the columns and rows of the table. Alternatively or in addition, the service provider server 240 may provide the comparison table as an interactive comparison table where the user A 120A may select multiple columns or rows to view information contained therein. In this example, the interactive comparison table may display each row or column selected by the user A 120A over a period of time. The interactive comparison table may prevent the display of unselected rows or columns, but may not prevent the display of other rows or columns which were previously selected during the period of time. The interactive comparison table thereby allows the user A 120A to selectively compare a subset of the information displayed in the interactive comparison table. The user A 120A can reset the interactive comparison table by clicking on a space outside of the interactive comparison table. When the user A 120A resets the interactive comparison table, the interactive comparison table clears all the columns and rows, including any columns and/or which were previously selected by the user A 120A. The user A 120A may then select one or more rows and/or columns to compare a subset of the information displayed in the interactive comparison table. Alternatively or in addition, the comparison tables may be hard coded into individual web pages associated with each business function identifier and/or job function identifier. In this example, the service provider server 240 may receive a selection of a business function identifier and job function identifier from the user A 120A, and may provide the user A 120A with the web page containing the comparison table associated with the received business function identifier and job function identifier.

Figure 8:
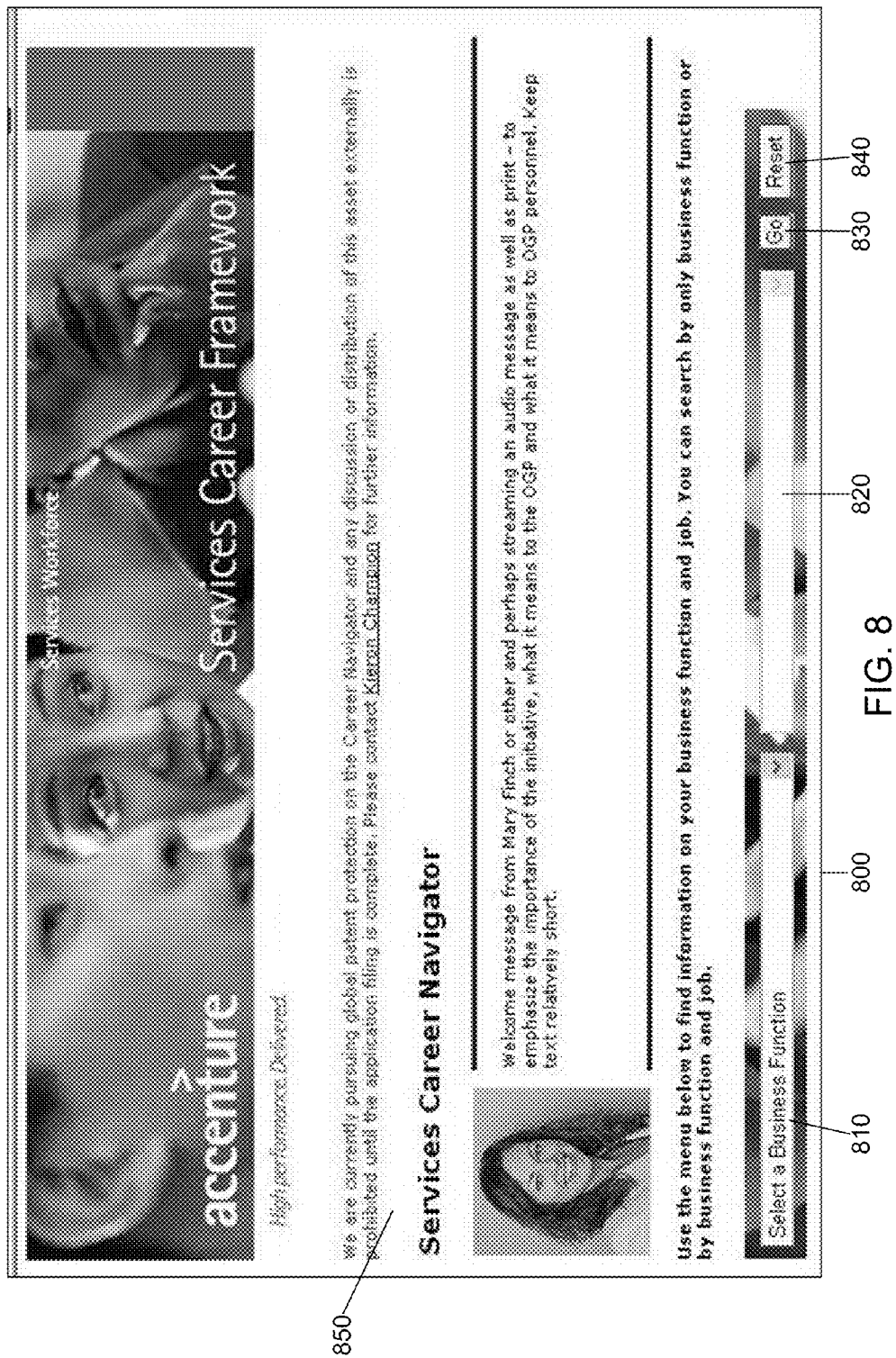
FIG. 8 is a screenshot of a user interface for selecting a business function and a job identifier in the system of FIG. 1, or other systems for providing an interactive career management tool.

FIG. 8 is a screenshot of a user interface 800 for selecting a business function identifier and a job identifier in the system of FIG. 1, or other systems for providing an interactive career management tool. The service provider server 240 may provide the user interface 800 to the user A 120A when the user A 120A requests to view career management information. The user interface 800 may include a business function selector 810, a job selector 820, a go button 830, a reset button 840, and an information display 850. The information display 850 may display one or more messages or notices related to the system 100. The business function selector 810 may allow the user to select an identifier of a business function of the organization. The job identifiers selectable in the job selector 820 may be dependent on the business function identifier selected by the user A 120A in the business function selector 810. That is, the job identifiers in the job selector 820 may change depending upon the business function identifier selected in the business function selector 810.

In operation, a user A 120A may select a business function identifier from the business function selector 810 and a job identifier from the job selector 820. The user A 120A may click on the go button 830 to submit the selections to the service provider server 240, or the user A 120A may click on the reset button 840 to reset the selectors 810, 820. When the user A 120A clicks on the go button 820 the business identifier and job identifier selected by the user A 120A are communicated to the service provider server 240. The service provider server 240 may retrieve job information relating to the selected identifiers and may transform the job information into an interactive table. The service provider server 240 may provide the interactive table to the user A 120A, such as the interactive tables of FIGS. 10A-B.

Figure 9A:
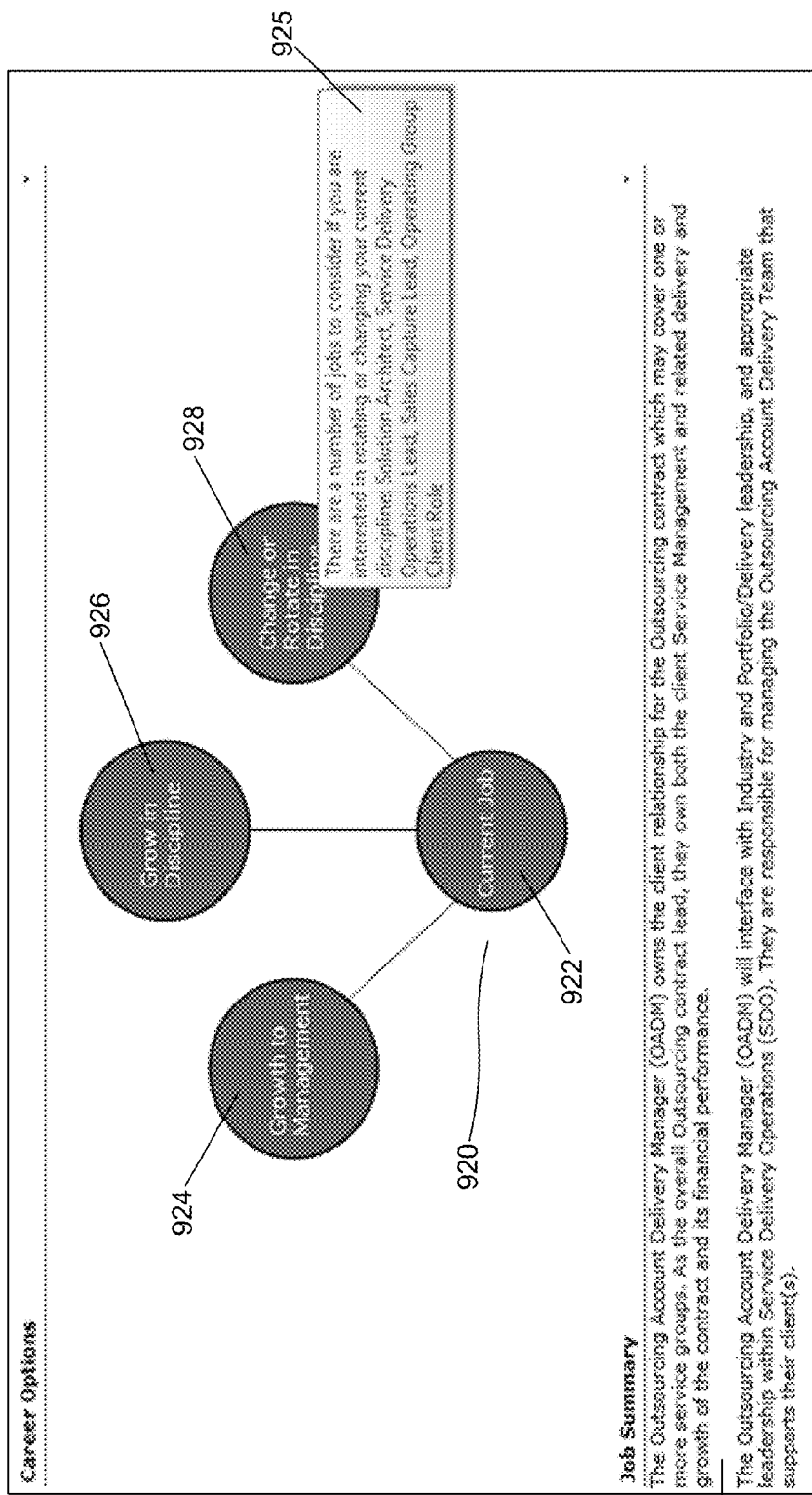
FIG. 9A is a screenshot of a user interface for accessing a career options interactive display in the system of FIG. 1, or other systems for providing an interactive career management tool.

FIG. 9A is a screenshot of a user interface 900A for accessing a career options interactive display in the system of FIG. 1, or other systems for providing an interactive career management tool. The user interface 900A may include a job summary section 910 and a career options interactive display 920. The career options interactive display 920 may include a current job graphic 922, a growth to management graphic 924, a grow in discipline graphic 926, a change discipline graphic 928, and a change discipline description 925.

In operation, the user A 120A may view a description of the selected job in the job summary section 910. The user A 120A may access the career options interactive display by manipulating a pointing device, such as a computer input device, to move a pointing icon over one of the graphics 922, 924, 926. When the pointing icon overlaps one of the graphics 922, 924, 926, 928, such as the growth to management graphic 924, the service provider server 240 may display the description associated with the growth to management graphics 924. For example, moving a pointing icon over the job graphic 922 may display a description of the selected job. Moving a pointing icon over the growth to management graphic 924 may cause the service provider server 240 to display management jobs available to the user A 120A. Moving a pointing icon over the growth in discipline graphic 926 may cause the service provider server 240 to display jobs within the same discipline of the selected job which may be available to the user A 120A. Moving the pointing icon over the change discipline graphic 928 may cause the service provider server 240 to display jobs in other disciplines available to the user A 120A. In the user interface 900A, the user A 120A may have moved the pointing icon over the change discipline graphic 928. In response, the service provider server 240 may display the change discipline description 925. The change discipline description 925 may display jobs available to the user A 120A if the user A 120A changes disciplines.

Figure 9B:
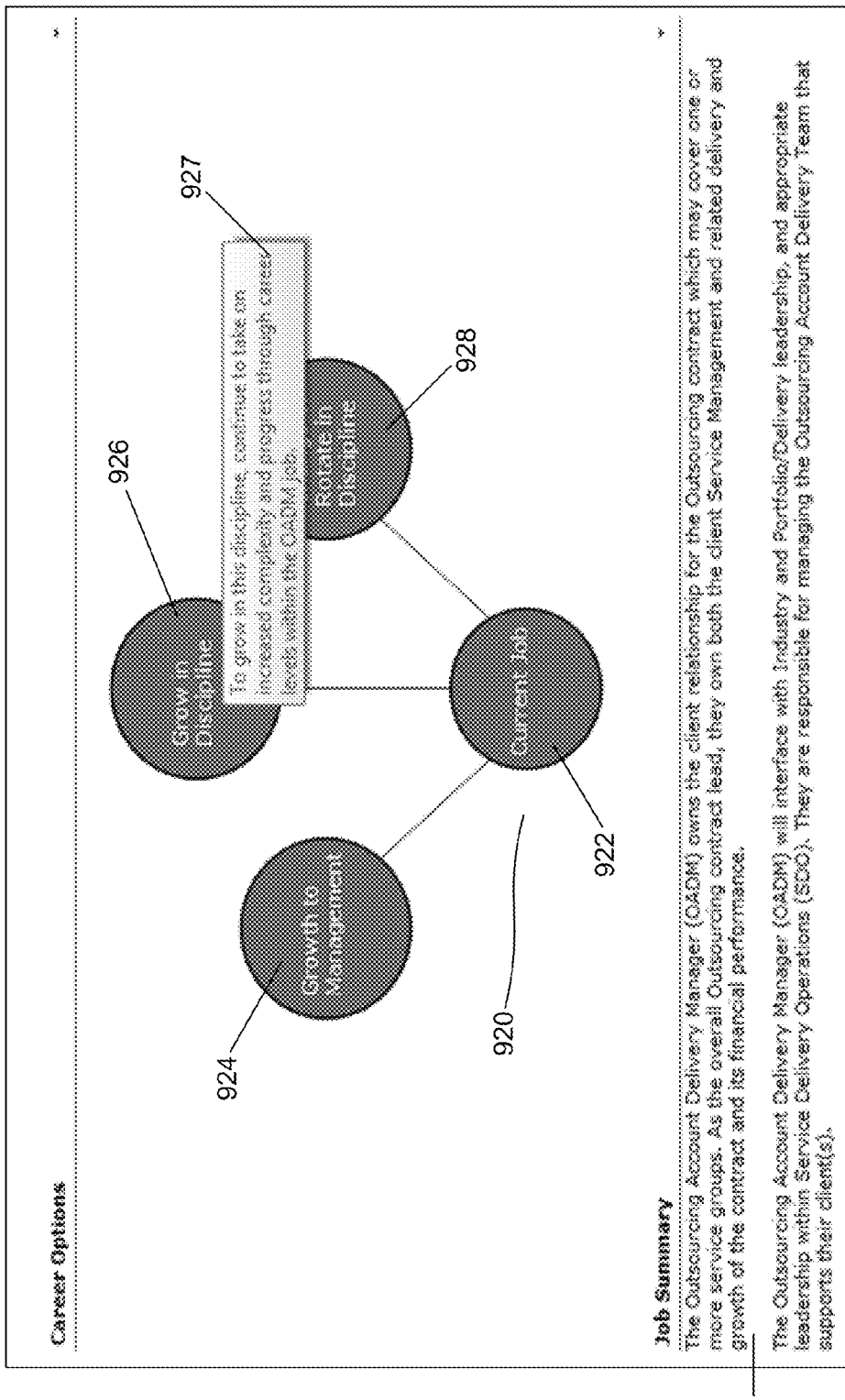
FIG. 9B is an alternative screenshot of a user interface for accessing a career options interactive display in the system of FIG. 1, or other systems for providing an interactive career management tool.

FIG. 9B is an alternative screenshot of a user interface 900B for accessing a career options interactive display in the system of FIG. 1, or other systems for providing an interactive career management tool. The user interface 900B may include a job summary section 910 and a career options interactive display 920. The career options interactive display 920 may include a current job graphic 922, a growth to management graphic 924, a grow in discipline graphic 926, a change discipline graphic 928, and a grow in discipline description 927.

In operation, the user A 120A may view a description of the selected job in the job summary section 910. The user A 120A may access the career options interactive display by manipulating a pointing device, such as a computer input device, to move a pointing icon over one of the graphics 922, 924, 926. When the pointing icon overlaps one of the graphics 922, 924, 926, 928, such as the growth to management graphic 924, the service provider server 240 may display the description associated with the growth to management graphics 924. For example, moving a pointing icon over the job graphic 922 may display a description of the selected job. Moving a pointing icon over the growth to management graphic 924 may cause the service provider server 240 to display management jobs available to the user A 120A. Moving a pointing icon over the growth in discipline graphic 926 may cause the service provider server 240 to display jobs within the same discipline of the selected job which may be available to the user A 120A. Moving the pointing icon over the change discipline graphic 928 may cause the service provider server 240 to display jobs in other disciplines available to the user A 120A. In the user interface 900B, the user A 120A may have moved the pointing icon over the grow in discipline graphic 926. In response, the service provider server 240 may display the grow in discipline description 927. The grow in discipline description 927 may display jobs available to the user A 120A within the current discipline of the user A 120A.

FIG. 10A is a screenshot of a user interface 1000A for accessing an interactive career management tool displaying a selected column in the system of FIG. 1, or other systems for providing an interactive career management tool. The user interface 1000A may include an experience column group 1010, a responsibility column group 1020, a job level header 1030, and a selected column 1040. The experience column group 1010 may include a degree of experience column header 1012 and a years of experience column header 1014. The scope of responsibility column group 1020 may include a work complexity column header 1022, a client accountability column header 1024, a people expectation management column header 1026, and a job criteria column header 1028.

In operation, the user A 120A may click on one of the job level headers 1030 to view the descriptions of the experience and responsibility requirements associated with the job level represented by the selected job level header. Alternatively or in addition, the user A 120A may click on one of the column headers in the experience column group 1010 or the responsibility column group 1020 to view descriptions of the experience or responsibility requirement represented by the selected column header for each of the job levels represented in the job level headers 1030. In the user interface 1000A, the user A 120A may have selected the work complexity column header 1022. In response to the user A 120A selecting the work complexity column header 1022, the service provider server 240 may display the information in the selected column 1040, while preventing the display of information contained in the unselected columns. If any of the columns were previously displaying data, the service provider server 240 may clear the information displayed in the columns when the user A 120A clicks on the work complexity column header 1022.

FIG. 10B is a screenshot of a user interface 1000B for accessing an interactive career management tool displaying a selected row in the system of FIG. 1, or other systems for providing an interactive career management tool. The user interface 1000B may include an experience column group 1010, a scope of responsibility column group 1020, a job level header 1030, and a selected row 1050. The experience column group 1010 may include a degree of experience column header 1012 and a years of experience column header 1014. The scope of responsibility column group 1020 may include a work complexity column header 1022, a client accountability column header 1024, a people expectation management column header 1026, and a job criteria column header 1028.

In operation, the user A 120A may click on one of the job level headers 1030 to view the descriptions of the experience and responsibility requirements associated with the job level represented by the selected job level header. Alternatively or in addition, the user A 120A may click on one of the column headers in the experience column group 1010 or the responsibility column group 1020 to view descriptions of the experience or responsibility requirement represented by the selected column header for each of the job levels represented in the job level headers 1030. In the user interface 1000A, the user A 120A may have selected the "Level D" job level header 1030. In response to the user A 120A selecting the "Level D" job level header 1030, the service provider server 240 may display the information in the selected row 1050, while preventing the display of information contained in the unselected rows. If any of the rows were previously displaying data, the service provider server 240 may clear the rows when the user A 120A clicks on the "Level D" job level header 1030.

FIG. 11 is a screenshot of a user interface 1100 for viewing a career management comparison table in the system of FIG. 1, or other systems for providing an interactive career management tool. The user A 120A may use the user interface 1100 to compare one or more job levels in the system 100. The user interface 1100 may include a job level row 1110, an experience row group 1120, and a scope of responsibility row group 1130. The job level row 1110 may include a senior executive column 1112, a job level A column 1114, and a job level B column 1116. The experience row group 1120 may include a degree of experience row 1122, and a years of job experience row 1124. The scope of responsibility row group 1130 may include a work complexity row 1132, a client accountability row 1134, a people management expectation row 1136 and a job specific scope row 1138.

In operation, the service provider server 240 may provide the user interface to the user A 120A in response to the user A 120A selecting a business function identifier and job identifier. Alternatively or in addition, the user A 120A may select one or more job levels associated with the business function identifier and the job identifier. The service provider server 240 then provides the user interface 1100 to the user A 120A to allow the user A 120A to compare the two or more selected job levels, or all of the job levels associated with the selected business function identifier and job identifier.

As mentioned above, the service provider server 240 may provide the user interface 1100 as an interactive comparison table where the user A 120A may select multiple columns or rows to view information contained therein. In this example, the user interface 1100 may display each row or column selected by the user A 120A over a period of time. The user interface 1100 may prevent the display of unselected rows or columns, but may not prevent the display of other rows or columns which were previously selected during the period of time, thus enabling the user A 120A to selectively compare a subset of the information displayed in the user interface 1100. The user A 120A can reset the user interface 1100 by clicking on a space outside of the user interface 1100. When the user A 120A resets the user interface 1100, the user interface 1100 will hide all the columns and rows, including any columns and/or which were previously selected by the user A 120A. The user A 120A may then select one or more rows and/or columns to compare a subset of the information displayed in the user interface 1100.

FIG. 12 illustrates a general computer system 1200, which may represent a service provider server 240, or any of the other computing devices referenced herein. The computer system 1200 may include a set of instructions 1224 that may be executed to cause the computer system 1200 to perform any one or more of the methods or computer based functions disclosed herein. The computer system 1200 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 1200 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions 1224 (sequential or otherwise) that specify actions to be taken by that machine. In a particular embodiment, the computer system 1200 may be implemented using electronic devices that provide voice, video or data communication. Further, while a single computer system 1200 may be illustrated, the term "system" shall also be taken to include any collection of systems or sub-systems that individually or jointly execute a set, or multiple sets, of instructions to perform one or more computer functions.

As illustrated in FIG. 12, the computer system 1200 may include a processor 1202, such as, a central processing unit (CPU), a graphics processing unit (GPU), or both. The processor 1202 may be a component in a variety of systems. For example, the processor 1202 may be part of a standard personal computer or a workstation. The processor 1202 may be one or more general processors, digital signal processors, application specific integrated circuits, field programmable gate arrays, servers, networks, digital circuits, analog circuits, combinations thereof, or other now known or later developed devices for analyzing and processing data. The processor 1202 may implement a software program, such as code generated manually (i.e., programmed).

The computer system 1200 may include a memory 1204 that can communicate via a bus 1208. The memory 1204 may be a main memory, a static memory, or a dynamic memory. The memory 1204 may include, but may not be limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one case, the memory 1204 may include a cache or random access memory for the processor 1202. Alternatively or in addition, the memory 1204 may be separate from the processor 1202, such as a cache memory of a processor, the system memory, or other memory. The memory 1204 may be an external storage device or database for storing data. Examples may include a hard drive, compact disc ("CD"), digital video disc ("DVD"), memory card, memory stick, floppy disc, universal serial bus ("USB")

memory device, or any other device operative to store data. The memory 1204 may be operable to store instructions 1224 executable by the processor 1202. The functions, acts or tasks illustrated in the figures or described herein may be performed by the programmed processor 1202 executing the instructions 1224 stored in the memory 1204. The functions, acts or tasks may be independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing and the like.

The computer system 1200 may further include a display 1214, such as a liquid crystal display (LCD), an organic light emitting diode (OLED), a flat panel display, a solid state display, a cathode ray tube (CRT), a projector, a printer or other now known or later developed display device for outputting determined information. The display 1214 may act as an interface for the user to see the functioning of the processor 1202, or specifically as an interface with the software stored in the memory 1204 or in the drive unit 1206.

Additionally, the computer system 1200 may include an input device 1212 configured to allow a user to interact with any of the components of system 1200. The input device 1212 may be a number pad, a keyboard, or a cursor control device, such as a mouse, or a joystick, touch screen display, remote control or any other device operative to interact with the system 1200.

The computer system 1200 may also include a disk or optical drive unit 1206. The disk drive unit 1206 may include a computer-readable medium 1222 in which one or more sets of instructions 1224, e.g. software, can be embedded. Further, the instructions 1224 may perform one or more of the methods or logic as described herein. The instructions 1224 may reside completely, or at least partially, within the memory 1204 and/or within the processor 1202 during execution by the computer system 1200. The memory 1204 and the processor 1202 also may include computer-readable media as discussed above.

The present disclosure contemplates a computer-readable medium 1222 that includes instructions 1224 or receives and executes instructions 1224 responsive to a propagated signal; so that a device connected to a network 235 may communicate voice, video, audio, images or any other data over the network 235. Further, the instructions 1224 may be transmitted or received over the network 235 via a communication interface 1218. The communication interface 1218 may be a part of the processor 1202 or may be a separate component. The communication interface 1218 may be created in software or may be a physical connection in hardware. The communication interface 1218 may be configured to connect with a network 235, external media, the display 1214, or any other components in system 1200, or combinations thereof. The connection with the network 235 may be a physical connection, such as a wired Ethernet connection or may be established wirelessly as discussed below. Likewise, the additional connections with other components of the system 1200 may be physical connections or may be established wirelessly. In the case of a service provider server 240, the service provider server 240 may communicate with users 120A-N through the communication interface 1218.

The network 235 may include wired networks, wireless networks, or combinations thereof. The wireless network may be a cellular telephone network, an 802.11, 802.16, 802.20, or WiMax network. Further, the network 235 may be a public network, such as the Internet, a private network, such as an intranet, or combinations thereof, and may utilize a variety of networking protocols now available or later developed including, but not limited to TCP/IP based networking protocols.

The computer-readable medium 1222 may be a single medium, or the computer-readable medium 1222 may be a single medium or multiple media, such as a centralized or distributed database, and/or associated caches and servers that store one or more sets of instructions. The term "computer-readable medium" may also include any medium that may be capable of storing, encoding or carrying a set of instructions for execution by a processor or that may cause a computer system to perform any one or more of the methods or operations disclosed herein.

The computer-readable medium 1222 may include a solid-state memory such as a memory card or other package that houses one or more non-volatile read-only memories. The computer-readable medium 1222 also may be a random access memory or other volatile re-writable memory. Additionally, the computer-readable medium 1222 may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that may be a tangible storage medium. Accordingly, the disclosure may be considered to include any one or more of a computer-readable medium or a distribution medium and other equivalents and successor media, in which data or instructions may be stored.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

The methods described herein may be implemented by software programs executable by a computer system. Further, implementations may include distributed processing, component/object distributed processing, and parallel processing. Alternatively or in addition, virtual computer system processing maybe constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

We claim:

1. A computer-implemented method for providing a client-side interactive career management tool, the method comprising:

receiving, by a processor from a device of a user, a business function identifier and a job identifier selected by the user to initiate the client-side interactive career management tool;

retrieving, on a network interface from a data store, a plurality of job levels associated with the business function identifier and the job identifier selected by the user, wherein each job level is associated with a plurality of experience descriptions and a plurality of expectation descriptions;

retrieving, by the processor from the data store, a plurality of career option descriptions associated with the business function identifier and the job identifier selected by the user;

transforming, by the processor, the job levels, the experience descriptions, the expectation descriptions, and the career option descriptions into an interactive table for the client-side interactive career management tool operative on the user device, in response to the user's selection of the business function identifier and the job identifier;

generating, by the processor, a user interactive table for display on the user device, the user interactive table including the plurality of job levels, the plurality of experience descriptions and the plurality of expectation descriptions, wherein the user interactive table displays the plurality of experience descriptions and the plurality of expectation descriptions associated with each displayed job level, within a plurality of rows and a plurality of columns arranged in a table-like format;

integrating hypertext markup language (HTML) with information of the user interactive table wherein the integrated HTML is operative at the user device to transform the table generated by the processor in response to a user selection of a row in the interactive table, without further interaction with the processor by the user device, by causing display of one of the job levels and a plurality of experience descriptions and expectation descriptions associated with the one job level in the user selected row of the user interactive table while preventing or hiding display of other job levels and plurality of experience descriptions and expectation descriptions associated with the other job levels of unselected rows of the user interactive table generated by the processor, and automatically resizing the display area of the user selected row to display text otherwise obscured by the unselected rows;

generating, by the processor, an interactive graphical display including the plurality of career option descriptions and a plurality of shapes, wherein each career option description is associated with a shape, and each career option description is displayed interactively when the user selects the associated shape;

integrating hypertext markup language (HTML) with the career option descriptions wherein the integrated HTML is operative to transform at the user device the career option descriptions into an interactive graphical display in response to a user selection in the interactive graphical display by causing a growth to management description relating to advancing to a management job to be displayed when a first shape is selected with a computer input device by a user, a growth within a discipline description relating to jobs available within the discipline to be displayed when a second shape is selected with a computer input device by a user, and a change discipline description relating to jobs available outside the discipline to be displayed when a third shape is selected with a computer input device by a user;

generating, by the processor, a user interactive comparison table configured to provide to the user in a user interface a display of a plurality of experience descriptions and a plurality of scope of responsibility descriptions corresponding to two or more job levels of the job identifier selected by the user, the user interactive comparison table providing side-by-side for each of the two or more job levels the plurality of experience descriptions and the scope of responsibility descriptions, wherein in response to a user selecting with a computer input device a plurality of table column headers or a plurality of table row headers in the user interactive comparison table, the user interface displays each row or column selected by the user and prevents the display of unselected rows or columns;

in response to a user clicking on a space outside of the user interactive comparison table, the user interactive comparison table clears all the columns and rows, including any columns or rows which were previously selected by the user; and providing, on a network interface and providing to the device of the user, any combination of the user interactive table, the interactive graphical display and the user interactive comparison table as a user interface display in a client-side interactive career management tool;

wherein the user interface is operative to display table rows or columns previously selected with additional selected table rows or columns during a period of time so as to enable selective comparison by a user of a subset of the information associated with the business function identifier and the job identifier selected by the user.

2. The computer-implemented method of claim 1 wherein the plurality of experience descriptions comprises a plurality of experience description types and at least one of the plurality of experience description types comprises a degree of experience description type or a years of experience description type.

3. The computer-implemented method of claim 2 wherein the user interactive table and user interactive comparison table display displays the experience description type associated with each job level when the user selects the experience description type, and inhibits displaying the other experience description types and the plurality of expectation descriptions not associated with the user selection.

4. The computer-implemented method of claim 1 wherein the plurality of scope of responsibility descriptions comprises a plurality of scope of responsibility description types and at least one of the plurality of scope of responsibility description types comprises a work complexity description type, a client accountability description type, a people management description type, or a job specific scope description type.

5. The computer-implemented method of claim 4 wherein the user interactive table and user interactive comparison table display displays the scope of responsibility description type associated with each job level when the user selects the expectation description type, and inhibits displaying the other scope of responsibility description types and the plurality of experience descriptions not associated with the user selection.

6. The computer-implemented method of claim 1 wherein the user interactive display is provided to the device of the user through a web page.

7. The computer-implemented method of claim 1 wherein the user interactive display further comprises a plurality of web log posts associated with the business function identifier and the job identifier.

8. The computer-implemented method of claim 1 wherein the plurality of career option descriptions comprises at least one of a growth to management description, a grow in discipline description or a change discipline description.

9. The computer-implemented method of claim 1 wherein the user selects a shape by moving a pointing icon over the shape.

10. A computer implemented method for interactively displaying career management information in a table-like format, the method comprising:
  receiving, by a processor from a device of a user, a business function identifier and a job identifier selected by the user to initiate a client-side interactive career management tool that operates from the device of the user;
  generating, by the processor, an interactive display as a user interface for display at the device of the user, the interactive display including a client-side interactive table, the client-side interactive table including a plurality of rows and a plurality of columns arranged in a table-like format, each row being associated with a row header and each column being associated with a column header, wherein information in the plurality of rows comprise a plurality of displayed job levels and information the plurality of columns comprise a plurality of displayed experience descriptions and a plurality of displayed expectation descriptions associated with the business function identifier and the job identifier selected by the user,
  integrating hypertext markup language (HTML) with the information of the client-side interactive table wherein the integrated HTML is operative at the user device to transform the client-side interactive table in response to a user selection in the client-side interactive table without further interaction with the processor by the device of the user, by causing display of the information in a user selected row of the client-side interactive table while preventing or hiding display of information in unselected rows of the client-side interactive table, and automatically resizing the display area of the user selected row to display text otherwise obscured by the unselected rows;
  generating, by the processor, an interactive comparison table configured to provide to the user, a display of a plurality of descriptions corresponding to two or more job levels of the job identifier, the two or more job levels providing a comparison of experience and scope of responsibilities for the two or more job levels;
  displaying, interactively on the display, a row of the plurality of rows when a user selects a row header associated with the row while inhibiting display of the rows in the plurality of rows not associated with the selected row header;
  displaying, interactively on the display, a column of the plurality of columns when a user selects a column header associated with the column while inhibiting display of the columns in the plurality of columns not associated with the selected column header;
  wherein in response to a user clicking on a space outside of the interactive comparison table, the interactive comparison table clears all the columns and rows, including any columns or which were previously selected by the user;
  displaying, in response to a user selecting with a computer input device interactively on the display a plurality of table column headers or a plurality of table row headers in the interactive comparison table:
    experience or scope of responsibilities that are associated with a plurality of selected job levels that are selected by the user in the table headers; or
    for all of the plurality of job levels, selected experience requirements or scope of responsibilities that are selected by the user in the table headers;
    wherein the user interface is operative to prevent the display of unselected rows or columns, and further operative to display rows or columns previously selected during a period of time so as to enable selective comparison of a subset of the information displayed; and
  wherein the user interface is operative to display table rows or columns previously selected with additional selected table rows or columns during a period of time so as to enable selective comparison by a user of a subset of the information associated with the business function identifier and the job identifier selected by the user.

11. The computer-implemented method of claim 10 wherein the plurality of experience descriptions comprises at least one of a degree of experience description or a years of experience description.

12. The computer-implemented method of claim 10 wherein the plurality of expectation descriptions comprises at least one of a work complexity description, a client accountability description, a people management description, or a job specific scope description.

13. The computer-implemented method of claim 10 wherein the plurality of rows and the plurality of columns are displayed on a device of a user.

14. The computer-implemented method of claim 10, wherein the plurality of experience descriptions, and the plurality of expectation descriptions are associated with the business function identifier and the job identifier.

15. The computer-implemented method of claim 14 further comprising, displaying, by the processor, a plurality of web log posts associated with the business function identifier and the job identifier.

16. A system for providing a client-side interactive career management tool, the system comprising:
a memory to store a plurality of career option descriptions and a plurality of job levels associated with a business function identifier and a job identifier that is selected by a user to initiate a client-side interactive career management tool that operates from a device of the user, wherein each job level is associated with a plurality of experience descriptions and a plurality of expectation descriptions;
an interface operatively connected to the memory, the interface operative to communicate with the device of the user; and
a processor operatively connected to the memory and the interface, the processor operative to:
receive, via a network interface and from the device of the user, the business function identifier and the job identifier to initiate the client-side interactive career management tool that operates from the device of the user;
retrieve, from the memory, the plurality of job levels associated with the business function identifier and job identifier, and the plurality of experience descriptions and the plurality of expectation descriptions associated with each job level;
retrieve, from the memory, the plurality of career option descriptions associated with the business function identifier and the job identifier selected by the user;
transform the job levels, the experience descriptions, the expectation descriptions, and the career option descriptions into the client-side interactive career management tool operative on the user device, in response to the user's selection of the business function identifier and the job identifier;
transform the plurality of job levels, the plurality of experience descriptions and the plurality of expectation descriptions into a client-side user interactive table, wherein the client-side user interactive table displays the plurality of experience descriptions and the plurality of expectation descriptions associated with each displayed job level, the user interactive table including a plurality of rows and a plurality of columns arranged in a table-like format;
integrating hypertext markup language (HTML) with information of the user interactive table wherein the integrated HTML is operative at the user device to transform the client-side interactive table at the user device in response to a user selection in a row of the client-side interactive table, without further interaction with the processor by the user device, by causing display of one of the job levels and a plurality of experience descriptions and expectation descriptions associated with the one job level in a user selected row of the user interactive table while preventing or hiding display of other job levels and plurality of experience descriptions and expectation descriptions associated with the other job levels in unselected rows of the user interactive table and automatically resizing the display area of the user selected row to display text otherwise obscured by the unselected rows;
transform the plurality of career option descriptions into an interactive graphical display comprising of a plurality of shapes, wherein each career option description is associated with a shape and each career option description is displayed when the user selects the associated shape and integrating hypertext markup language (HTML) with the career option descriptions wherein the integrated HTML is operative to transform at the user device the career option descriptions into an interactive graphical display in response to a user selection in the interactive graphical display by causing a growth to management description relating to advancing to a management job to be displayed when a first shape is selected with a computer input device by a user, a growth within a discipline description relating to jobs available within the discipline to be displayed when a second shape is selected with a computer input device by a user, and a change discipline description relating to jobs available outside the discipline to be displayed when a third shape is selected with a computer input device by a user, and provide, to the device of the user, the user interactive table and the interactive graphical display as client-side a user interactive interface;
the processor further configured to:
generate and provide in a user interactive interface to the user, a user interactive comparison table providing a plurality of experience descriptions and a plurality of scope of responsibility descriptions corresponding to two or more job levels of the job identifier selected by the user, the user interactive comparison table providing side-by-side for each of the two or more job levels the plurality of the experience descriptions and the scope of responsibilities, and wherein the processor provides a comparison between job responsibility requirements of two or more job levels in response to a user request, and wherein in response to the user selecting with a computer input device a plurality of table column headers or a plurality of table row headers in the user interactive comparison table, the user interactive interface displays each row or column selected by the user and prevents the display of unselected rows or columns, and in response to a user clicking on a space outside of the user interactive comparison table, the user interactive comparison table clears all the columns and rows, including any columns or rows which were previously selected by the user;
wherein the user interactive interface is operative to prevent the display of unselected table rows or columns, and further operative to display table rows or columns previously selected with additional selected table rows or columns during a period of time so as to enable selective comparison by a user of a subset of the information associated with the business function identifier and the job identifier selected by the user; and
provide on a network interface to the device of the user the user interactive table, the user interactive comparison table and the interactive graphical display as a user interface.

17. The system of claim 16 wherein the plurality of experience descriptions comprises a plurality of experience description types and at least one of the plurality of experience description types comprises a degree of experience description type or a years of experience description type.

18. The system of claim 17 wherein the user interactive table and the user interactive comparison table display displays the experience description type associated with each job level when the user selects the experience description type, and prevents displaying the other experience description types and the plurality of expectation descriptions when the user selects the experience description type.

19. The system of claim 16 wherein the plurality of scope of responsibility descriptions comprises a plurality of scope of responsibility description types and at least one of the plurality of scope of responsibility description types comprises a work complexity description type, a client accountability description type, a people management description type, or a job specific scope description type.

20. The system of claim 19 wherein the user interactive table and the user interactive comparison table display displays the scope of responsibility description type associated with each job level when the user selects the scope of responsibility description type, and prevents displaying the other scope of responsibility description types and the plurality of experience descriptions when the user selects the scope of responsibility description type.

21. The system of claim 16 wherein the processor is further operative to provide the user interactive interface display to the device of the user through a web page.

22. The system of claim 16 wherein the user interactive interface display further comprises a plurality of web log posts associated with the business function identifier and the job identifier.

23. The system of claim 16 wherein the plurality of career option descriptions comprises at least one of a growth to management description, a grow in discipline description or a change discipline description.

* * * * *